(12) United States Patent
Poor et al.

(10) Patent No.: US 7,495,582 B2
(45) Date of Patent: *Feb. 24, 2009

(54) GEOGRAPHIC INFORMATION STORAGE, TRANSMISSION AND DISPLAY SYSTEM

(75) Inventors: Jeffrey Poor, Rockledge, FL (US); Michael Mos, Melbourne, FL (US); Dale Burton, Melbourne, FL (US); Robert Mitchell, Alpine, CA (US); Christopher Duffey, Titusville, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,002

(22) Filed: Mar. 8, 2005

(65) Prior Publication Data
US 2006/0208927 A1 Sep. 21, 2006

(51) Int. Cl.
*G08G 1/123* (2006.01)
(52) U.S. Cl. .............. 340/995.1; 340/995.15; 340/995.11; 701/208; 701/213
(58) Field of Classification Search .......... 340/995.1, 340/995.11, 995.14, 995.15, 995.16, 539.11, 340/539.13
See application file for complete search history.

(56) References Cited

U.S. PATENT DOCUMENTS 5,696,684 A    12/1997    Uberschaer (Continued)

FOREIGN PATENT DOCUMENTS

EP    0 178 742 B1    8/1990

(Continued)

*Primary Examiner*—Benjamin C Lee
*Assistant Examiner*—Travis R Hunnings
(74) *Attorney, Agent, or Firm*—Alan G. Towner, Esq.; Pietragallo Gordon Alfano Bosick & Raspanti, LLP (57) ABSTRACT

A system is disclosed in which a geographic area of interest can be selected, and information corresponding to the selected area can be downloaded and displayed by a user in an efficient and timely manner. The geographic area of interest may initially be selected by various input means such as a map, longitude/latitude coordinates, a global positioning system (GPS), and the like. Once the particular geographic area has been selected, geographic information corresponding to the selected area is downloaded to the user. The geographic information may include photographic images, radar, radio transmission, cell phone transmission, time sequenced images, ground moving target information, air moving target information, maritime moving target information, red or blue force identification and/or potential hazard areas information. The geographic information may be stored in a suitable data storage system such as a server. Alternatively, the geographic information may be generated real time and downloaded to the user. In one embodiment, the geographic information includes photographic images and a relatively low resolution image of a large geographic area is initially displayed to the user. The user can then select a limited region of the photographic image for closer viewing. The limited region of the photographic image may then be downloaded to the user in a higher resolution format, thereby reducing the amount of high resolution data that must be transmitted to the user. Various display devices may be used, such as personal data assistants (PDAs), laptop computers, desktop computers, vehicle-mounted computers, tablets, cell phones and the like. The display device may also be used as the input device to both select the geographic area of interest and display the photographic images or other geographic information of the selected area.

31 Claims, 8 Drawing Sheets

U.S. PATENT DOCUMENTS

| | | | |
|---|---|---|---|
| 5,712,903 A * | 1/1998 | Bartholomew et al. | 379/88.25 |
| 5,809,265 A | 9/1998 | Blair et al. | |
| 6,748,323 B2 * | 6/2004 | Lokshin et al. | 701/213 |
| 7,057,508 B2 * | 6/2006 | Banks et al. | 340/539.13 |

FOREIGN PATENT DOCUMENTS

| | | |
|---|---|---|
| EP | 0 334 459 B1 | 9/1994 |
| WO | WO 01/63392 A2 | 8/2001 |

* cited by examiner

TIME SEQUENCED IMAGES
FROM AN EO SENSOR
FIG. 9

SYNTHETIC APERTURE RADAR (SAR) IMAGE
FIG. 8

GEOGRAPHIC INFORMATION STORAGE, TRANSMISSION AND DISPLAY SYSTEM

FIELD OF THE INVENTION

The present invention relates to a geographic information storage, transmission and display system, and more particularly relates to a system in which a particular geographic area is identified by a user, and information corresponding to that area, such as photographic images, radar images, radio transmission information, cell phone transmission information, time sequenced images, ground moving target information (GMTI), air moving target information (AMTI), maritime moving target information (MMTI), red or blue force identification and/or potential hazard areas, is downloaded to the user via an input/output device.

BACKGROUND INFORMATION

Photographic images of various geographic regions are available from sources such as aircraft and satellite-mounted cameras. Other information relating to geographic regions may also be obtained, such as radar images, radio transmission information, cell phone transmission information, time sequenced images, moving target information (MTI), potential hazard areas and force identification. However, such information typically embodies a vast amount of data that is difficult to transmit and display to users in a timely fashion.

SUMMARY OF THE INVENTION

The present invention provides a system in which a geographic area of interest can be selected, and information relating to that area can be downloaded and displayed by a user in an efficient and timely manner. The area of interest may be selected using an input device by various means such as a map, longitude/latitude coordinates, a global positioning system (GPS), and the like. Once the particular geographic area has been selected, information corresponding to the selected area are downloaded to the user. The geographic information may include photgraphic images, radar images, radio transmission information, cell phone transmission information, time sequenced images, ground moving target information (GMTI), air moving target information (AMTI), maritime moving target information (MMTI), red or blue force identification and/or potential hazard areas, such as land mines.

In one embodiment, the geographic information includes photographic images. The images may comprise visible photographs, infrared (IR) or electo-optical (EO) photographs or other types of photographic images that may be stored in a suitable data storage system such as a server. In addition to stored image data, the photographic image data may also be generated real time and transmitted to the user using the present system. The images may be captured by any suitable digital or analog device such as an aircraft-mounted camera or a satellite-mounted camera.

In one embodiment, a relatively low resolution photographic image of a large geographic area is initially displayed to the user, and the user can then select a limited region of the image for closer viewing. The selected limited region of the image may then be downloaded to the user in a higher resolution format, thereby reducing the amount of high resolution data that must be transmitted to the user. Various display devices may be used, such as a personal data assistant (PDA), laptop computer, desktop computer, vehicle-mounted computer, tablet, cell phone and the like. In addition to displaying the desired image, the display device may also be used as the input device to identify the geographic area of interest, e.g., by initially displaying a map of the region from which the specific area of interest is identified. In one embodiment, the photographic image may be overlaid over the map display.

In addition to photographic images, other types of information relating to the geographic area of interest may be downloaded and displayed. For example, radar images, radio transmission information, cell phone transmission information, time sequenced images, ground moving target information (GMTI), air moving target information (AMTI), maritime moving target information (MMTI), red or blue force identification and/or potential hazard areas, may be displayed to the user.

An aspect of the present invention is to provide a system for displaying geographic information comprising an input device for selecting a geographic area of interest, and a display device for displaying geographic information corresponding to at least a portion of the selected geographic area, wherein the geographic information may be displayed at different resolutions.

Another aspect of the present invention is to provide a system for displaying geographic information comprising an input device for selecting a geographic area of interest, and a display device for displaying geographic information corresponding to at least a portion of the selected geographic area, wherein the geographic information comprises at least two types of information selected from the group consisting of photographic images, radar images, radio transmission information, cell phone transmission information, time sequenced images, ground moving target information, air moving target information, maritime moving target information, red or blue force identification and potential hazard areas.

A further aspect of the present invention is to provide a system for storing, transmitting and displaying geographic information comprising a geographic information data storage device, an input device communicating with the geographic information data storage device for selecting a geographic area of interest, and a display device communicating with the geographic information data storage device for displaying geographic information corresponding to at least a portion of the selected geographic area, wherein the geographic information may be displayed at different resolutions.

Another aspect of the present invention is to provide a method of displaying geographic information comprising selecting a geographic area of interest, and displaying geographic information corresponding to at least a portion of the selected geographic area, wherein the geographic information may be displayed at different resolutions.

These and other aspects of the present invention will be more apparent from the following description.

DETAILED DESCRIPTION

Figure 1:
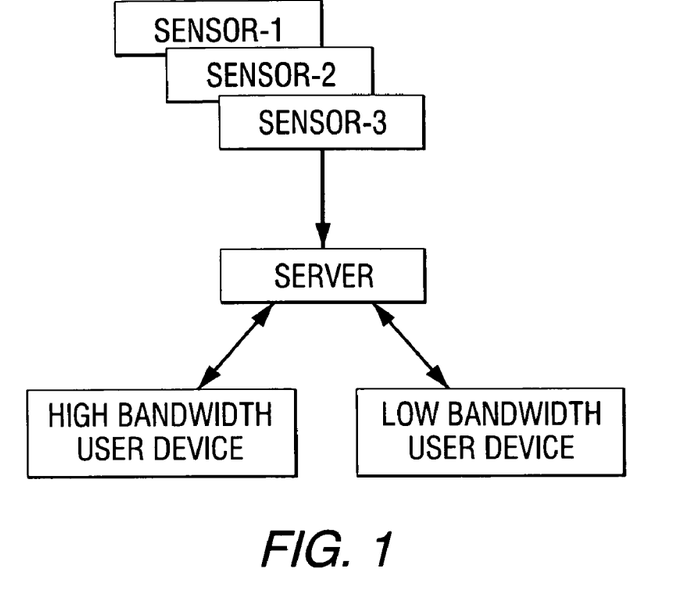
FIG. 1 is a schematic diagram of a geographic information storage, transmission and display system in accordance with an embodiment of the present invention.

FIG. 1 schematically illustrates a geographic information storage, transmission and display system in accordance with an embodiment of the present invention. As used herein, the term "geographic information" means information relating to a geographic area, such as photographic images, radar images, radio transmission information, cell phone transmission information, time sequenced images, ground moving target information (GMTI), air moving target information (AMTI), maritime moving target information (MMTI), red or blue force identification and/or potential hazard areas. For example, the geographic information may include photographic images, in which case the images may be captured by an image sensor such as a digital or analog camera. The photographic images may be images taken in the visible region of the electromagnetic spectrum, other wavelengths such as infrared and the like. The image sensor may be mounted on any suitable platform which provides a desirable view of the geographic areas, such as aircraft and satellites, as well as surface-based sensors.

As shown in FIG. 1, after the geographic information is captured by sensor(s), it may be transmitted to a server for storage and/or transmission. The server may be of any suitable configuration such as Microsoft Windows or Linux based portable computer (PC) systems. The sensor(s) communicate with the server by any suitable means such as standard commercial video interface (RS-170), video capture card, parallel data interface, network interface or the like. In one embodiment, the server may store information relating to the same or similar geographic region captured at different times. In many instances, the most recent geographic information is desired. However, in some cases it may be desirable to view earlier information corresponding to the particular geographic region.

In the embodiment shown in FIG. 1, the server communicates with both a high bandwidth user input/output device and a low bandwidth user input/output device. Examples of high bandwidth user input/output devices include personal data assistants, laptop computers, desktop computers, vehicle-mounted computers, tablets, cell phones and the like. Examples of low bandwidth user input/output devices include personal data assistants, laptop computers, desktop computers, vehicle-mounted computers, tablets, cell phones and the like.

The server communicates with the high bandwidth user input/output device by any suitable means such as a standard wired network interface, or a wireless network interface. The server communicates with the low bandwidth user input/output device by any suitable means such as a standard synchronous or asynchronous serial interface connected to a UHF radio or dial-up phone connection. Although FIG. 1 illustrates an embodiment in which both high bandwidth and low bandwidth user input/output devices are used, it is to be understood that the present system may alternatively use only high bandwidth or low bandwidth user input/output devices.

Figure 2:
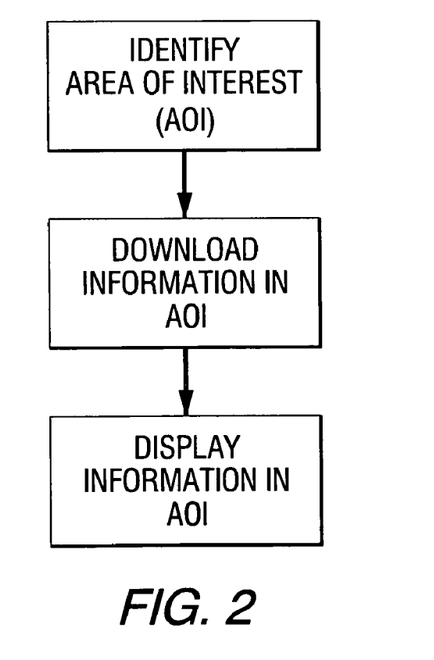
FIG. 2 is a flow diagram illustrating a method of identifying a geographic area of interest, downloading information corresponding to that area to a user, and displaying the information in accordance with a method of the present invention.

FIG. 2 illustrates a method of identifying a geographic area of interest, downloading information corresponding to that area to a user, and displaying the information in accordance with an embodiment of the present invention. A geographic area of interest may be identified by various means such as a map, longitude/latitude coordinates, a global positioning system, photographs and the like. In one embodiment, a geographic map or photograph may be displayed on any suitable device such as a personal data assistant (PDA), laptop computer, desktop computer, vehicle-mounted computer, tablet, cell phone or the like. Alternatively, the user may identify longitude and latitude coordinates corresponding to a particular geographic area of interest. In another embodiment, a GPS system may be used to display a map of a geographic area in which a GPS transceiver is located. When identifying a geographic area of interest, it may be useful to adjust the scale of the region, e.g., by zooming in or zooming out of a map of the region. Furthermore, once a general geographic area of interest has been identified, it may be useful to adjust the viewed area, e.g., by moving East, West, North, South or combinations thereof on a display map of the area.

As shown in FIG. 2, once the geographic area of interest has been identified, information corresponding to that area may be downloaded. For example, photographic and/or radar image data corresponding to the identified geographic area may be transmitted from a server via communication means to a high bandwidth and/or low bandwidth user output device, such as those described in connection with FIG. 1. In many cases, it is desirable to download the most recent information available for the geographic area of interest. However, it is also possible to select and download earlier information corresponding to the geographic area if desired. By downloading geographic information obtained at different times, it is possible to display time-sequenced information such as the movement of objects on the ground over a period of time.

The geographic information corresponding to the identified geographic area of interest is then displayed by means of any suitable display device such as a PDA, laptop computer, desktop computer, vehicle-mounted computer, tablet, cell phone or the like. In one embodiment, where a map is initially used to identify the geographic area of interest, the geographic information such as photographic and/or radar images corresponding to the identified geographic area may be displayed together on the same display screen. For example, the photographic and/or radar images may be displayed side by side with the map of the area, or the image may be overlayed on the map of the area.

Figure 3:
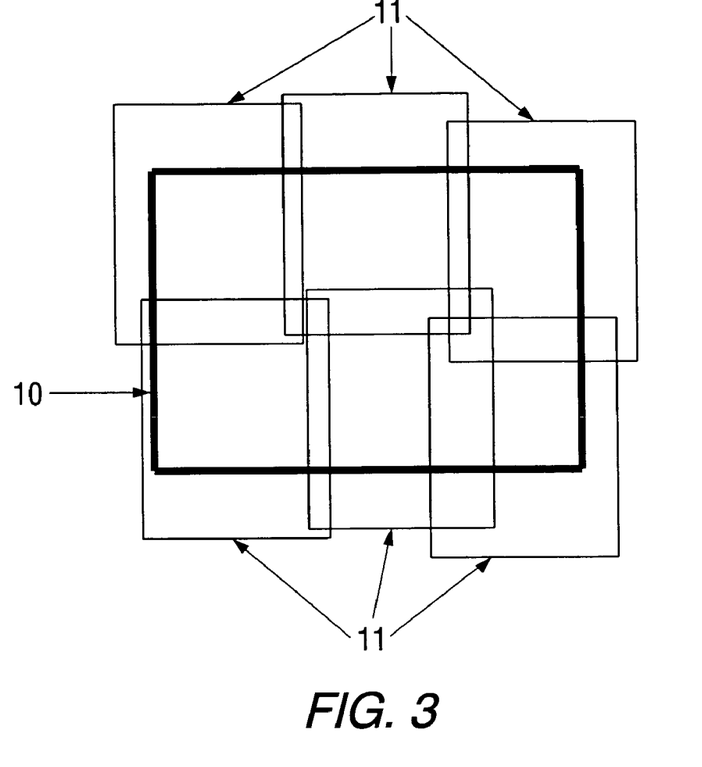
FIG. 3 is a partially schematic illustration of a map including overlaid frames corresponding to stored images taken from the region. The image data from part or all of the selected area may be downloaded and displayed in accordance with an embodiment of the present invention.

FIG. 3 illustrates a map of a geographic region 10 including overlaid frames 11 corresponding to individual images taken of the region which are then combined together. If a selected geographic area 10 corresponds to more than one of the images 11, those multiple images 11 may be combined together before or at the time the specific geographic area is selected for viewing. Multiple images may be geograpically "stitched" together to create a single mosaic image of the geographic area in the requested area.

Figure 4:
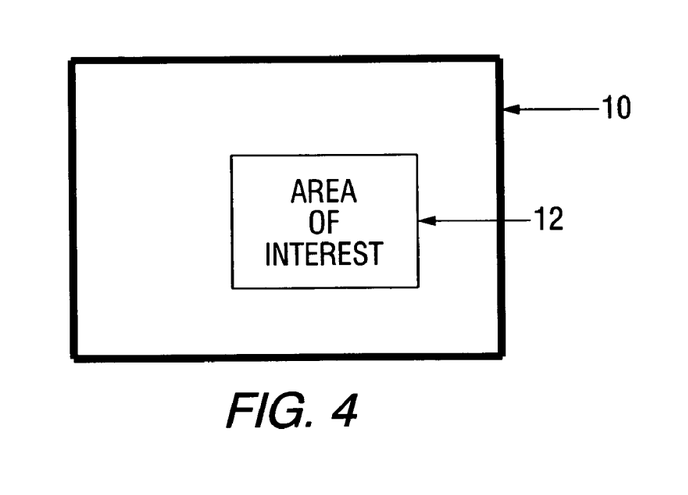
FIG. 4 illustrates a relatively large geographic area within which a smaller area is selected from high-resolution image downloading and display in accordance with an embodiment of the present invention.

FIG. 4 illustrates a photographic image of a relatively large geographic area 10 in which a smaller geographic area 12 is selected for detailed viewing in accordance with an embodiment of the present invention. In accordance with this embodiment, it is possible to download a low-resolution photographic image of the large region 10, followed by downloading a higher-resolution photographic image of the particular small region 12 of interest. In this manner, significantly less data must be transmitted because only a limited portion of the geographic area image is downloaded in a high-resolution format. The resolution of the high-resolution image may be at least 10 times greater than the resolution of the low-resolution image, typically at least 100 or 1,000 times greater. For example, a low-resolution image may have a resolution down to 4 or 5 meters per pixel, while a high-resolution image may have a resolution of 1 or 2 meters per pixel, or less.

The high-resolution and low-resolution images may originate from the same image sensor, or different image sensors. For example, a relatively low resolution digital camera may generate a low-resolution photographic image, while a relatively high-resolution digital camera may generate a high-resolution photographic image corresponding to the relatively small geographic area 12 selected. Alternatively, a single digital camera may be used to collect high resolution images, and the resolution of the large geographic area 10 initially transmitted to the user may be electronically reduced in resolution in order to decrease the amount of data image that must be initially transmitted to the user. In this embodiment, after the user selects the smaller geographic area 12 for detailed viewing, the higher-resolution image data may then be transmitted to the user.

Figure 5:
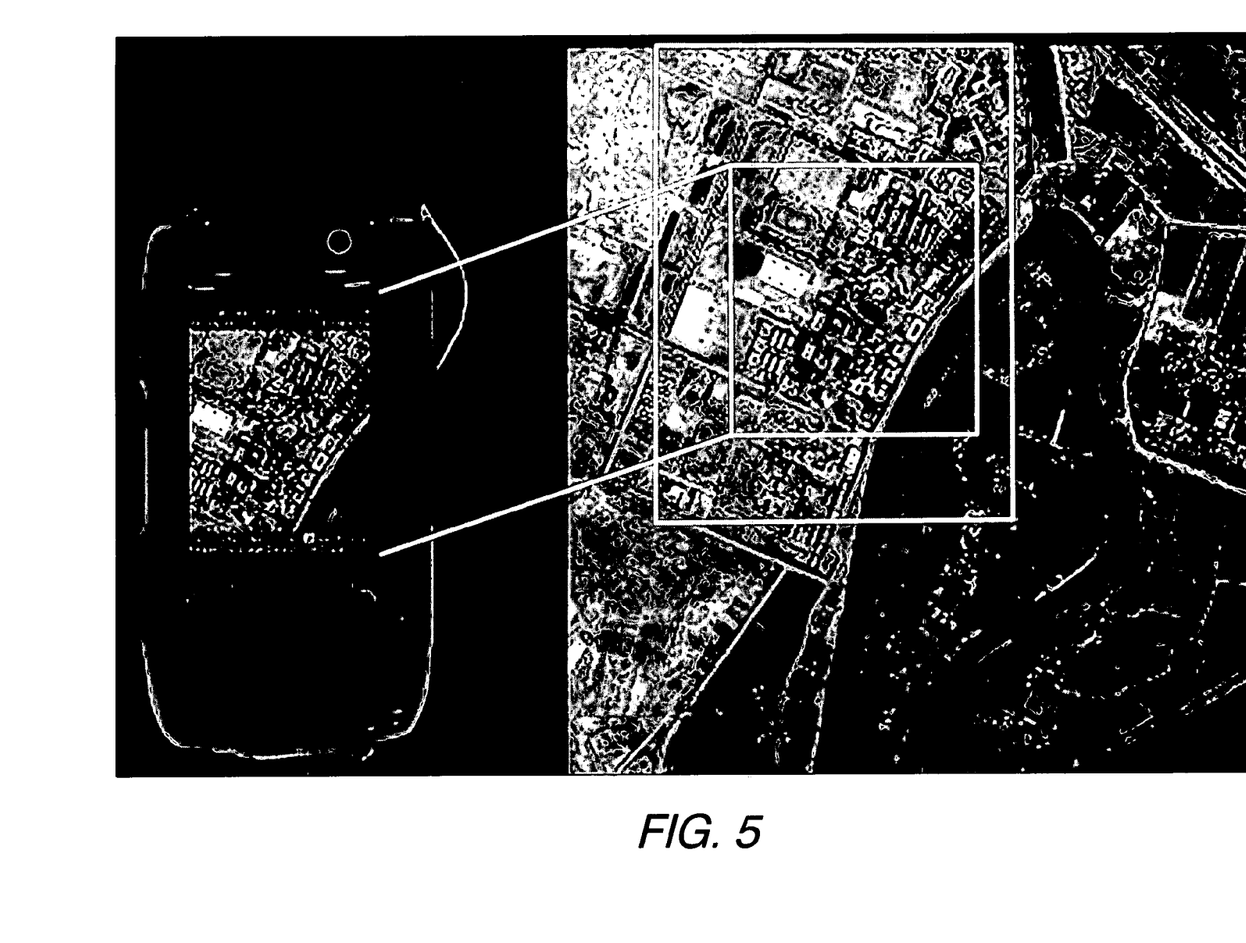
FIGS. 5-7 illustrate a relatively low resolution photographic image of a large region that may be manipulated to select a smaller region within the area that may be efficiently downloaded and displayed at a significantly higher resolution in accordance with an embodiment of the present invention.
Figure 6:
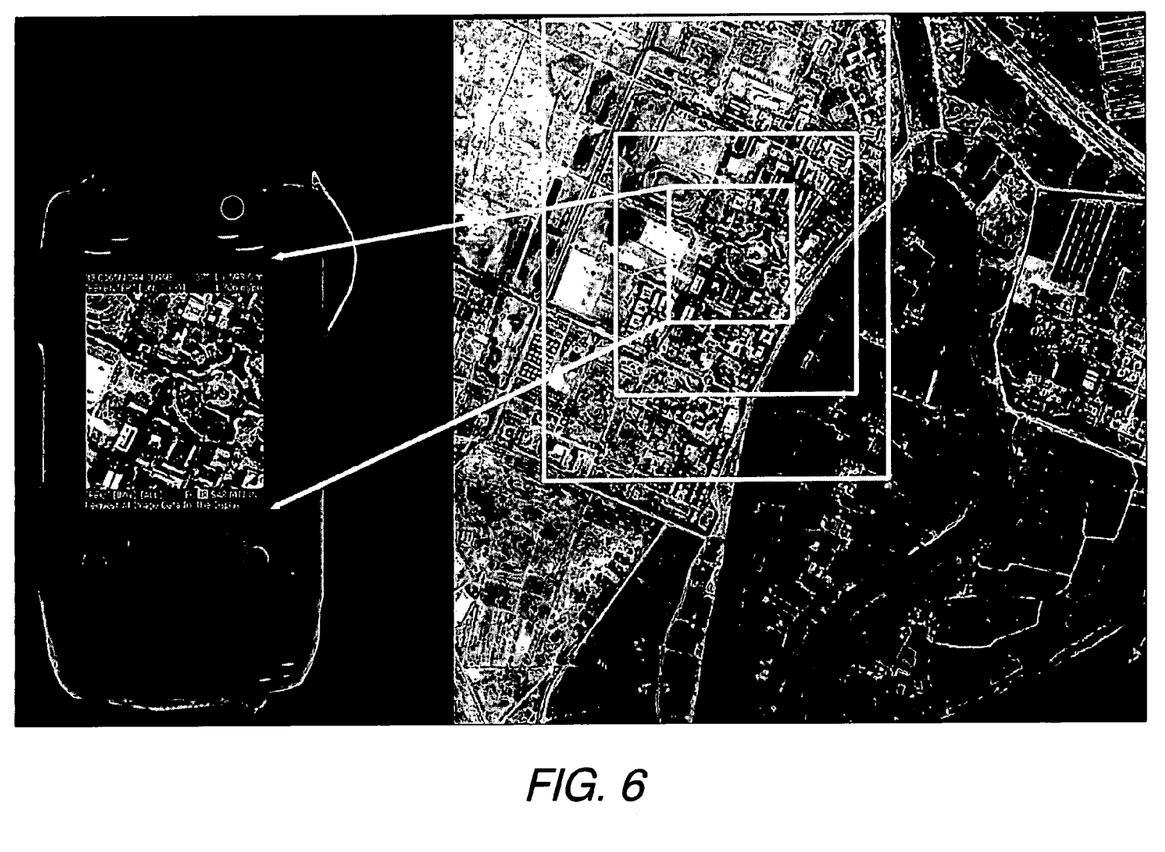
Figure 7:
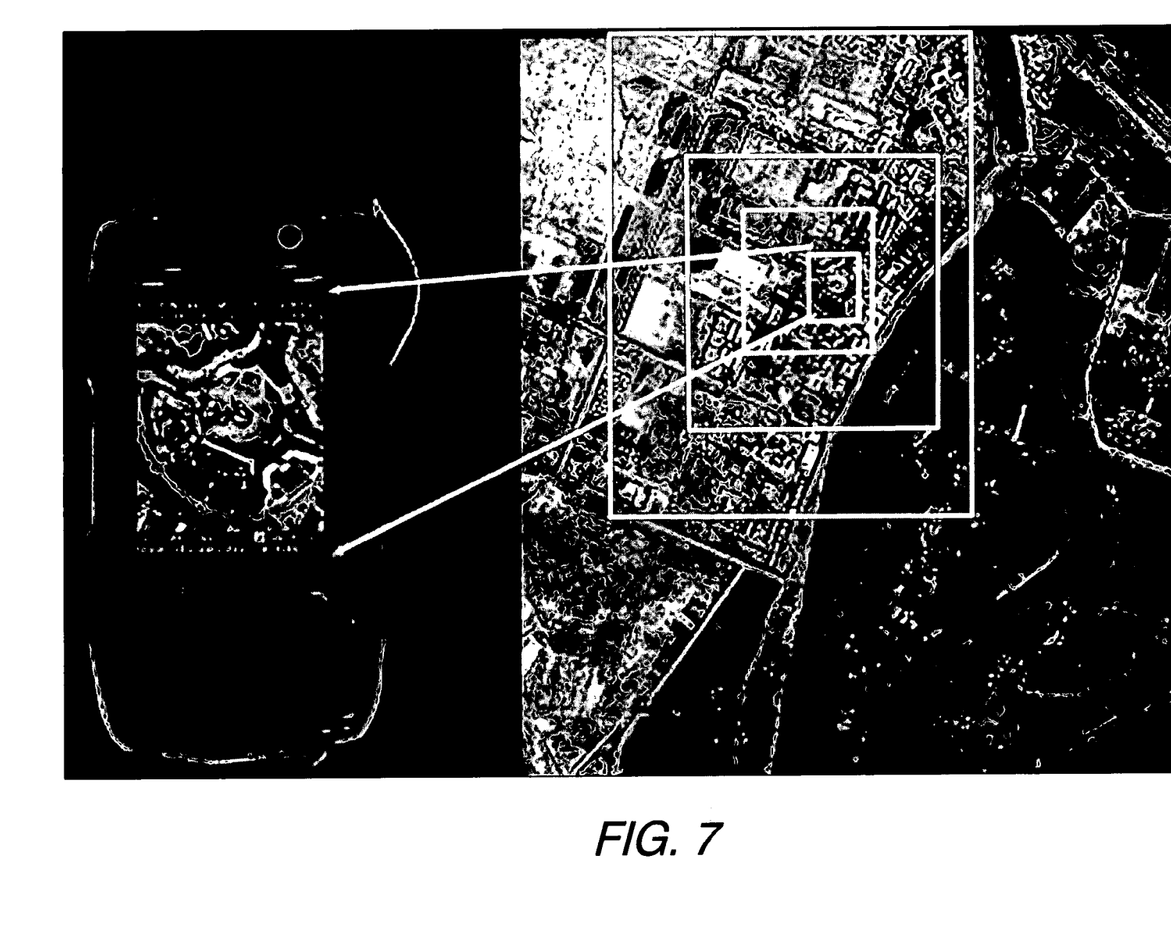

FIGS. 5-7 illustrate a photographic image of a large region that may be manipulated to select smaller regions within the area which may be efficiently downloaded and displayed at a significantly higher resolution in accordance with an embodiment of the present invention. In FIG. 5, the user requests photographic images via longitude/latitude coordinates or a map. A server then transmits a relatively low resolution photographic image of an area of interest. This low-resolution image may be downloaded and viewed from the server within a reasonable amount of time, e.g., less than 20 seconds. In FIG. 5, the full image is 9.8 km×9.8 km at 0.6 m resolution. The full image corresponding to the entire photographic image shown in FIG. 5 includes approximately 270 million image pixels.

Based upon the PDA display shown in FIG. 5, the user may select a smaller geographic area for higher resolution photographic image display. FIG. 6 illustrates one such higher resolution photographic image display, which may be transmitted to the PDA within a reasonable time, e.g., less than 20 seconds.

If an even higher resolution image of a smaller geographic area is desired, the user may select, download and display such a photographic image, as illustrated in FIG. 7.

Table 1 summarizes the PDA display resolution (m/pixel), display coverage, transmission time, percentage of total pixels and cumulative percentage of pixels for various resolution layers, including those illustrated in FIGS. 5-7.

TABLE 1

PDA Display (320 × 240 pixels)

| Display m/pixel | Display Coverage | Display Coverage (Km2) | Xmit Time 38.4 Kbps | % of Total Pixels | Cumulative % of Pixels | Layer |
|---|---|---|---|---|---|---|
| 9.6 | 3.0 Km × 2.3 Km | 7.1 Km2 | 16 sec | 0.03 | 0.03 | Res 4 |
| 4.8 | 1.5 Km × 1.1 Km | 1.7 Km2 | 16 sec | 0.03 | 0.06 | Res 3 |
| 2.4 | 0.8 Km × 0.6 Km | 0.4 Km2 | 16 sec | 0.03 | 0.09 | Res 2 |
| 1.2 | 0.4 Km × 0.3 Km | 0.1 Km2 | 16 sec | 0.03 | 0.12 | Res 1 |
| 0.6 | 0.2 Km × 0.1 Km | <0.1 Km2 | 16 sec | 0.03 | 0.15 | Res 0 |

As smaller and smaller geographic area photographic images are selected and displayed as shown in FIGS. 5-7 and described in Table 1, extremely high resolution imagery is available to the user in a relatively short amount of time. For example, it may take less than one or two minutes to go from the low resolution, large geographic area shown in FIG. 5 to the high resolution, small geographic area shown in FIG. 7. In doing so, only about 0.15 percent of the original 270 million pixels are transmitted to the user.

Figure 8:
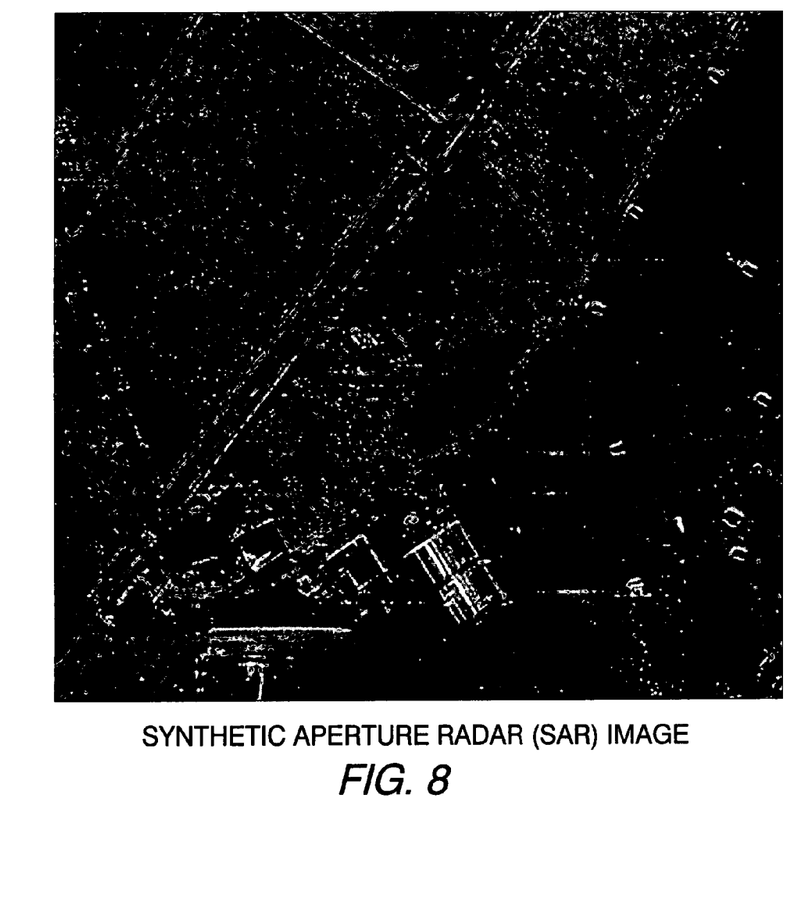
FIG. 8 illustrates a relatively low resolution radar image of a large region that may be manipulated to select a smaller region within the area that may be efficiently downloaded and displayed at a significantly higher resolution in accordance with an embodiment of the present invention.

FIG. 8 illustrates a relatively low resolution radar image of a large region that may be manipulated to select a smaller region within the area that may be efficiently downloaded and displayed at a significantly higher resolution in accordance with an embodiment of the present invention.

Figure 9:
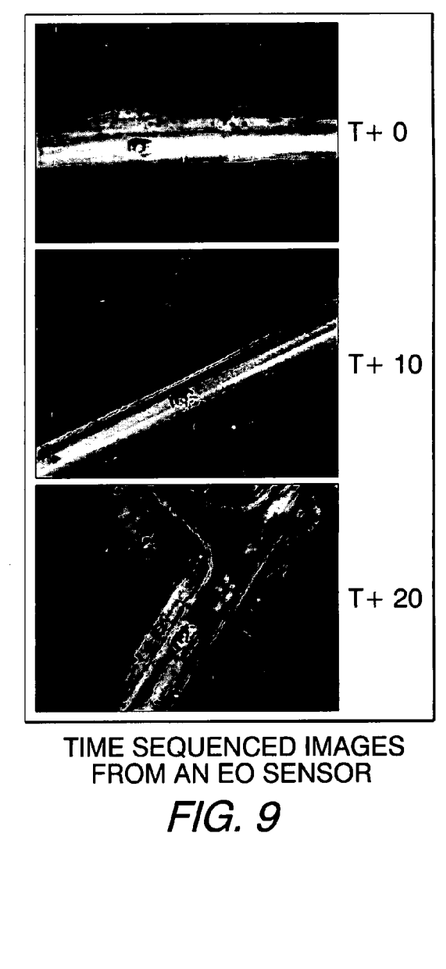
FIG. 9 illustrates a time-sequenced video stream provided by a server to a user for a specified time period within a geographic region of interest.

FIG. 9 illustrates a time-sequenced video stream provided by a server to a user for a specified time period within a geographic region of interest.

Figure 10:
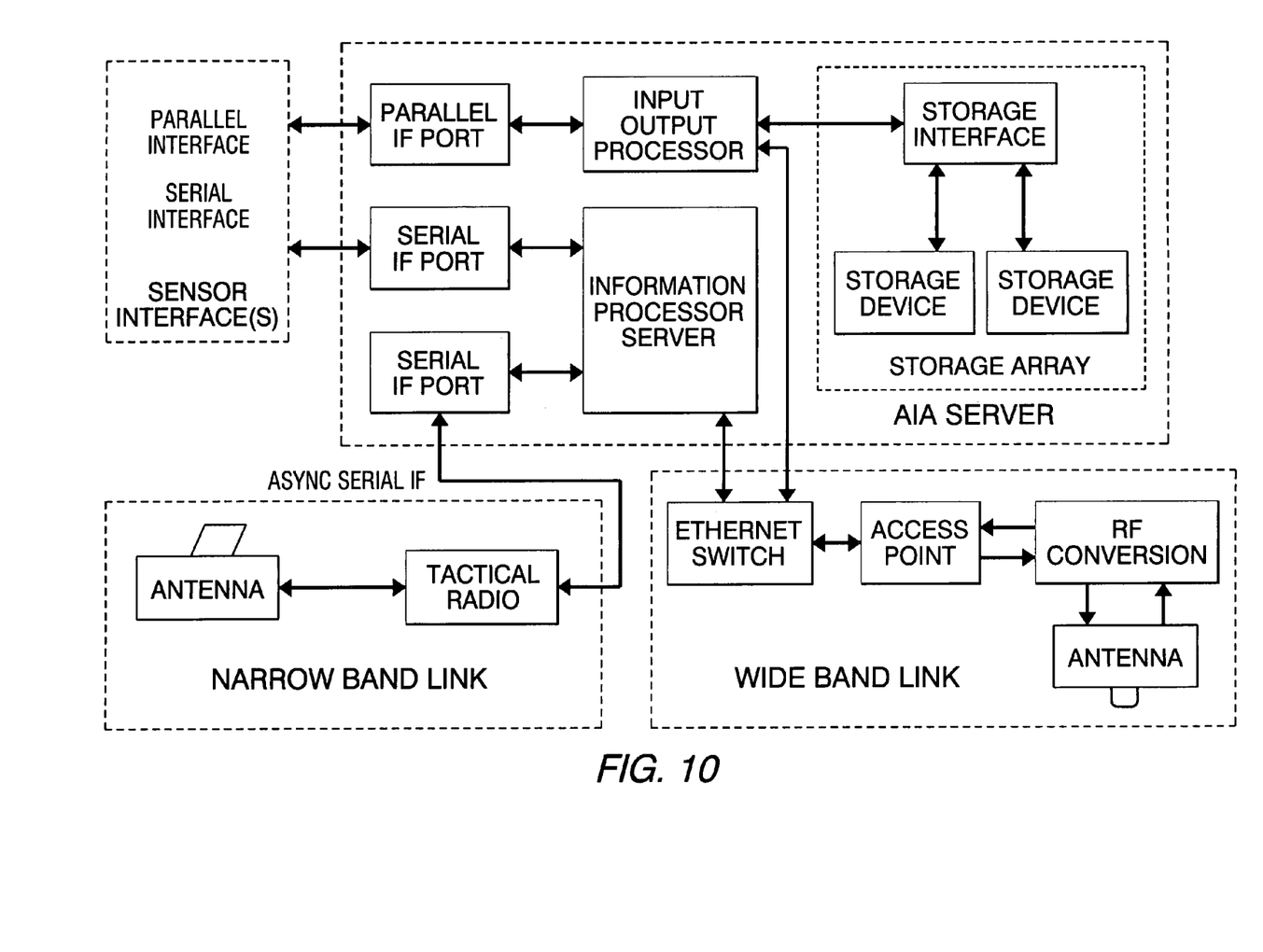
FIG. 10 is a schematic diagram illustrating details of a system in accordance with an embodiment of the present invention.

FIG. 10 schematically illustrates an image collection, storage and dissemination system in accordance with an embodiment of the present invention. The system includes parallel and serial interfaces to one or more sensors, input/output processor (IOP), storage interface and storage devices (e.g., disk drives or solid state memory), an information process server (IPS), a narrow band link configuration (serial interface, radio and antenna), and a wide bank link configuration (network interface, network switch, network access point, RF convertor hardware and antenna).

As shown in FIG. 10, the present system collects imagery over the parallel interface through the IOP, and catalogs the data received and stores the data on the storage device(s). Narrow band or wide band user requests received are handled by the IPS processor, which acquires the raw data logged on the storage device(s), creates the requested image product, and returns the product back over the corresponding data link.

As shown in FIG. 10, the system contains a narrow band link which consists of a military grade tactical radio and compatible antenna configuration. The IPS processor communicates to the tactial radio data rates between 16K-bits and 78K-bits per second.

FIG. 10 also illustrates the wide band link which consists of a connection from the IPS to the link via an ethernet interface (100M-bit per second) to a standard network switch, which is then routed by a network access point. Output from the access point is then up-converted to radio frequency (RF) through RF hardware for output through the antenna. Conversly, RF data is received through the antenna, down-converted by the RF hardware, pushed to the access point and enters the AIA server via the network interface hardware.

Figure 11:
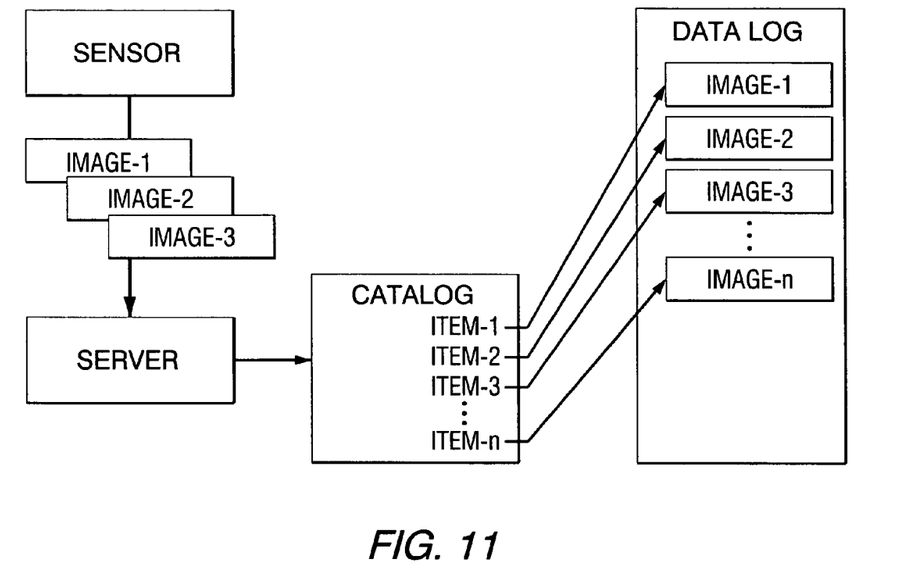
FIG. 11 is an information collection, catalog and logging flow chart illustrating operation of a system in accordance with an embodiment of the present invention.

FIG. 11 is a flow chart summarizing the multiple image collection and storage, cataloging, and data logging functions in accordance with the present invention.

Whereas particular embodiments of this invention have been described above for purposes of illustration, it will be evident to those skilled in the art that numerous variations of the details of the present invention may be made without departing from the invention as defined in the appended claims.

The invention claimed is:

1. A system for displaying geographic information comprising:
   an input device for selecting a geographic area of interest;
   a display device for displaying geographic information corresponding to at least a portion of the selected geographic area, wherein the geographic information may be displayed at different resolutions and comprises photographic images, radar images, radio transmission information, cell phone transmission information, time sequenced images, ground moving target information, air moving target information, maritime moving target information, red or blue force identification or potential hazard areas; and
   a geographic information data storage device communicating with the input device and the display device, wherein the geographic information data storage device stores information relating to the selected geographic area at different times, and the display device may sequentially display the geographic information relating to the same position in the selected geographic area from the different times.

2. The system of claim 1, wherein the input device and the display device are a single device.

3. The system of claim 1, wherein the input device comprises a display.

4. The system of claim 3, wherein the display of the input device also displays the geographic information corresponding to the selected geographic area.

5. The system of claim 1, wherein the input device displays a map.

6. The system of claim 5, wherein at least a portion of the geographic information is overlaid on at least a portion of the map.

7. The system of claim 1, wherein the input device uses longitude and/or latitude coordinates in selecting the geographic area of interest.

8. The system of claim 1, wherein the input device uses a global positioning system in selecting the geographic area of interest.

9. The system of claim 8, wherein the input device comprises a global positioning system transmitter and the selected geographic area of interest includes the location of the transmitter.

10. The system of claim 1, wherein the input device comprises a personal data assistant, laptop computer, desktop computer, vehicle-mounted computer, tablet or camera.

11. The system of claim 1, wherein the display device comprises a personal data assistant, laptop computer, desktop computer, vehicle-mounted computer or tablet.

12. The system of claim 1, wherein at least one of the displayed geographic information corresponds to substantially the entire selected geographic area.

13. The system of claim 1, wherein the geographic information comprises photographic and/or radar images.

14. The system of claim 13, wherein at least one of the displayed images corresponds to substantially the entire selected geographic area and comprises a relatively low resolution image, and at least another one of the displayed images corresponds to a portion of the selected geographic area and comprises a relatively high resolution image having a higher resolution than the low resolution image.

15. The system of claim 1, wherein the geographic information data storage device comprises a server.

16. The system of claim 1, wherein the geographic information data storage device transmits the geographic information data to the display device by narrowband communication means.

17. The system of claim 1, wherein the geographic information data storage device transmits the geographic information data to the display device by broadband communication means.

18. The system of claim 1, wherein the geographic information data storage device transmits the geographic information data to the display device selectively by narrowband communication means and broadband communication means.

19. The system of claim 1, further comprising means for initially transmitting the geographic information data to the display device at a relatively low resolution, and for subsequently transmitting a portion of the geographic information data to the display device at a relatively high resolution to display information corresponding to the portion of the selected geographic area.

20. The system of claim 1, wherein at least a portion of the geographic information data transmitted to the display device comprises multiple images stored in an image data storage device.

21. The system of claim 20, wherein the multiple images include overlapping portions.

22. The system of claim 1, further comprising another display device communicating with the geographic information data storage device.

23. The system of claim 22, wherein the geographic information data storage device transmits geographic information data to one of the display devices by broadband communication means and transmits geographic information data to the other display device by narrowband communication means.

24. The system of claim 1, wherein the geographic information comprises at least two types of information selected from the group consisting of photographic images, radar images, radio transmission information, cell phone transmission information, time sequenced images, ground moving target information, air moving target information, maritime moving target information, red or blue force identification or potential hazard areas.

25. The system of claim 24, wherein the geographic information comprises photographic and/or radar images.

26. A system for storing, transmitting and displaying geographic information comprising:
   a geographic information data storage device;
   an input device communicating with the geographic information data storage device for selecting a geographic area of interest; and
   a display device communicating with the geographic information data storage device for displaying geographic information corresponding to at least a portion of the selected geographic area, wherein the geographic information comprises photographic images, radar images, radio transmission information, cell phone transmission information, time sequenced images, ground moving target information, air moving target information, maritime moving target information, red or blue force identification or potential hazard areas, and wherein the geographic information data storage device stores information relating to the selected geographic area at different times, and the display device may sequentially display the geographic information relating to the same position in the selected geographic area from the different times.

27. The system of claim 26, wherein the geographic information comprises photographic and/or radar images.

28. A method of displaying geographic information comprising:

storing geographic information on a geographic information data storage device;

selecting a geographic area of interest; and displaying geographic information corresponding to at least a portion of the selected geographic area on a display device, wherein the geographic information may be displayed at different resolutions and comprises photographic images, radar images, radio transmission information, cell phone transmission information, time sequenced images, ground moving target information, air moving target information, maritime moving target information, red or blue force identification or potential hazard areas, and wherein the geographic information data storage device stores information relating to the selected geographic area at different times, and the display device may sequentially display the geographic information relating to the same position in the selected geographic area from the different times.

29. The method of claim 28, wherein the geographic information comprises photographic and/or radar images.

30. The system of claim 26, wherein the input device and the display device comprise a personal data assistant, laptop computer, desktop computer, vehicle-mounted computer, tablet or camera.

31. The method of claim 28, wherein the geographic area of interest is selected with an input device, the geographic image is displayed on a display device, and the input device and the display device comprise a personal data assistant, laptop computer, desktop computer, vehicle-mounted computer, tablet or camera.

\* \* \* \* \*